United States Patent
Sciancalepore et al.

(10) Patent No.: US 11,349,775 B2
(45) Date of Patent: May 31, 2022

(54) MULTI-RESOURCE AND AUTONOMOUS HIERARCHICAL BROKERING PLATFORM TO ENABLE SLICE RESOURCE EXCHANGE AMONG HETEROGENEOUS NETWORK TENANTS

(71) Applicant: NEC Laboratories Europe GmbH, Heidelberg (DE)

(72) Inventors: Vincenzo Sciancalepore, Heidelberg (DE); Lanfranco Zanzi, Heidelberg (DE); Antonio Albanese, Heidelberg (DE); Xavier Costa Perez, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 218 days.

(21) Appl. No.: 16/819,218

(22) Filed: Mar. 16, 2020

(65) Prior Publication Data
US 2021/0288918 A1  Sep. 16, 2021

(51) Int. Cl.
*H04L 47/783* (2022.01)
*H04L 9/06* (2006.01)
(Continued)

(52) U.S. Cl.
CPC .......... *H04L 47/783* (2013.01); *H04L 9/0643* (2013.01); *H04L 47/745* (2013.01); *H04L 47/788* (2013.01); *H04L 2209/38* (2013.01)

(58) Field of Classification Search
CPC ... H04L 47/783; H04L 9/0643; H04L 47/745; H04L 47/788; H04L 2209/38;
(Continued)

(56) References Cited

U.S. PATENT DOCUMENTS

2018/0218456 A1\* 8/2018 Kolb .................. G06Q 30/08
2021/0248598 A1\* 8/2021 Jain ..................... G06F 21/44

FOREIGN PATENT DOCUMENTS

EP      3477890 A1    5/2019
WO  WO 2017/140356 A1  8/2017
(Continued)

OTHER PUBLICATIONS

Rawat, Danda B. and Alshaikhi, Amani, "Leveraging Distributed Blockchain-based Scheme for Wireless Network Virtualization with Security and QoS Constraints," ICNC: Communications and Information Security Symposium, IEEE, Mar. 2018.
(Continued)

*Primary Examiner* — Kiet Tang
(74) *Attorney, Agent, or Firm* — Leydig, Voit & Mayer, Ltd.

(57) ABSTRACT

A method for enabling dynamic resource ownership transfer among network slice tenants includes acquiring an initial share of resources, admitting a plurality of tenants to a private blockchain platform, initiating a resource transaction process within a consortium of peer nodes, and validating proposed transactions in a distributed and automated way. An infrastructure provider (InP) provides a mobile network that is virtually divided into a set of slices, and an intermediate broker (IB) regulates transactions, executed via a blockchain, by which resources are distributed between tenants. A smart contract (SC) running within the blockchain implements resource auditing among tenants and enforces IB-specific policies in managing transfers of the resources between the tenants. A consensus algorithm validates the transactions, and the infrastructure provider (InP) processes validated transactions and enforces transaction directives in the resource allocation process.

19 Claims, 6 Drawing Sheets

(51) Int. Cl.
*H04L 47/74* (2022.01)
*H04L 47/78* (2022.01)

(58) Field of Classification Search
CPC .... H04L 41/5054; G06Q 10/00; G06Q 30/08; G06F 21/44
See application file for complete search history.

(56) References Cited

FOREIGN PATENT DOCUMENTS

| WO | WO 2019/152750 A1 | 8/2019 | |
|---|---|---|---|
| WO | WO 2019/177988 A1 | 9/2019 | |
| WO | WO 2019/197883 A1 | 10/2019 | |
| WO | WO-2021025600 A1 * | 2/2021 | ......... H04L 41/5054 |

OTHER PUBLICATIONS

Backman, Jere et al. "Blockchain Network Slice Broker in 5G: Slice Leasing in Factory of the Future Use Case," IEEE, Nov. 2017.

Nour, Boubakr et al. "A Blockchain-Based Network Slice Broker for 5G Services," IEEE Networking Letters, vol. 1, No. 3, Sep. 2019.

Matinmikko-Blue, Marja et al. "Micro operators for ultra-dense network deployment with network slicing and spectrum micro licensing," IEEE, Jun. 2018.

Li, Wenting et al. "Towards Scalable and Private Industrial Blockchains," BCC'17, Apr. 2, 2017, Abu Dhabi, United Arab Emirates.

Marsan, Marco Ajmone et al. "5G Italy White Book: from Research to Market," Consorzio Nazionale Interuniversitario per le Telecomunicazioni, Nov. 2018.

Caballero, Pablo et al. "Network Slicing Games: Enabling Customization in Multi-Tenant Networks," arXiv:1612.08446v4, Feb. 19, 2017.

Afraz, Nima et al. "Evolution of Access Network Sharing and its Role in 5G Networks," Preprints, Sep. 16, 2019.

Zhou, Xuan et al. "Network Slicing as a Service: Enabling Enterprises' Own Software-Defined Cellular Networks," IEEE Communications Magazine, Jul. 2016.

* cited by examiner

MULTI-RESOURCE AND AUTONOMOUS HIERARCHICAL BROKERING PLATFORM TO ENABLE SLICE RESOURCE EXCHANGE AMONG HETEROGENEOUS NETWORK TENANTS

FIELD

The present invention relates to methods and systems for allocating network resources in a mobile network infrastructure, and more particularly, to the decentralized allocation of network resources in a mobile network infrastructure.

BACKGROUND

The network slicing paradigm enables third-party service providers to run applications on top of modular mobile architectures in order to reach their end-users. The end-to-end service provisioning is guaranteed through advanced and dynamic resource allocation schemes and through the definition of dedicated performance metrics which, in their final description, translate service requirements into allocation of physical and virtualized networking resources.

The infrastructure provider (InP) owns the mobile network, i.e., the set of radio base stations (e.g. eNBs), communication lines, and the information technology (IT) facilities running the authentication and mobility management processes aimed at providing the connectivity service. The InP is also responsible for the management and maintenance of the mobile network. Slice tenants, e.g. vertical market software provides and over-the-top (OTT) service providers, can embrace the mobile ecosystem and explore novel sources of revenue, overcoming the traditional connectivity services in favor of dedicated virtual network instances, or slices, customized to meet specific service requirements and performance.

In the service model envisioned by 5th generation (5G) mobile networks, slice tenants can interact with the InP, request a quota of network resources, and choose a set of traffic management mechanisms to support their service provisioning. The InP is then in charge of instructing the mobile network infrastructure with the required settings. Finally, tenants pay the InP for hosting their service according, e.g., to the amount of reserved resources. See, e.g., WO 2017/140356. While it is envisioned that the network slice market will unlock a wide set of business opportunities, the management of a multitude of relatively small network slices introduces additional complexity into the orchestration process (due, e.g., to the increase in requests that the system needs to be able to handle). Furthermore, if the network slices are geographically constrained—as is often the case with small business industries and factories—local monitoring solutions may be necessary to ensure that the service level agreement (SLA) guarantees are satisfied thereby further increasing complexity into the orchestration process.

In this context, the role of the InP can be analogized to the role of a wholesaler. From the perspective of the InP, it is preferable to deal with the exchange of large quantities of goods (i.e. network resources) to intermediate resellers rather than trade small quantities directly with the end-user (which would entail a significant increase in management costs). Thus, this opens the market to 3rd-party entities willing to play the role of retailers (e.g. mobile virtual network operators (MVNOs), municipalities in the case of public events, highway operators, and factories)—which may buy a quota of network resources from the InP and re-sell it to end-users, e.g. network slice tenants. Such business entities can be referred to as intermediate brokers (IBs). In this manner, a network slicing economy can be envisioned as an open market where tenants can select the IB that best suits their requirements, e.g., better price, thus leading at the creation of a consortia of tenants managed by the same IB.

Recently, the highly trusted environment provided by the blockchain has been exploited to discourage over-committing issues during the negotiation of service level agreements (SLAs) and frequency channel assignments between InP and MVNOs. See, e.g., D. B. Rawat and A. Alshaikhi, "Leveraging Distributed Blockchain-based Scheme for Wireless Network Virtualization with Security and QoS Constraints," in International Conference on Computing, Networking and Communications (ICNC), March 2018, pp. 332-336. Such work has focused on RAN-specific resource negotiation without considering other network domains.

Moreover, a study on the leasing ledger concept proposing blockchain technology as a means to overcome absence of trust in data management and satisfy the need for automated solutions in industrial network facilities has recently been conducted. See, e.g., J. Backman, S. Yrjl, K. Valtanen, and O. Mmmel, "Blockchain Network Slice Broker in 5G: Slice leasing in factory of the future use case," in Internet of Things Business Models, Users, and Networks, November 2017.

However, neither of the above-mentioned solutions envisions any slice resource transfer among tenants in a secure manner nor discloses any intermediate broker to efficiently manage networking and computational resources.

In a framework proposed by other recent work, a network slice is envisioned as a composition of sub-slices, where each sub-slice represents the set of networking resources and functionalities of an administrative or technological domain. See, e.g., B. Nour, A. Ksentini, N. Herbaut, P. A. Frangoudis and H. Moungla, "A Blockchain-Based Network Slice Broker for 5G Services," in IEEE Networking Letters, vol. 1, no. 3, pp. 99-102, September 2019. When stitched together, the sub-slices create an end-to-end slice carrying a dedicated 5G network service. It should be noticed that slice requests are transferred by means of a public (permission-less) blockchain infrastructure, and that the slice brokering mechanism proposed therein implies that for every slice query a set of contracts (one for each sub-slice) must be generated and negotiated among different resource providers. However, such an approach does not guarantee the actual satisfaction of the initial slice request nor a successful deployment, and said recent work does not disclose any information about how to deal with the absence of resources or overly-expensive Sub-Slice Deployment Costs (SSDCs).

Finally, other recent work proposes and discusses the applicability of the micro-operator concept to local ultra-dense networks. See, e.g., M. Matinmikko-Blue, S. Yrjoelae and M. Latva-aho, "Micro Operators for Ultra-Dense Network Deployment with Network Slicing and Spectrum Micro Licensing," 2018 IEEE 87th Vehicular Technology Conference (VTC Spring), Porto, 2018. The micro-operator concept allows new stakeholders to take the micro operator role and deploy an ultra-dense small cell radio access network (RAN) in specific locations and establish a fully functional network, tailored for a specific service delivery, in collaboration with various infrastructure service providers. A micro operator can install and manage local wireless network and roaming contracts with e.g., mobile network operators (MNOs) in different locations such as factories, campuses, malls, and sports arenas. To support this concept, said recent work suggests evolving the current spectrum licensing model (which grants MNOs a limited number of long-term spectrum access rights to deploy mobile communication networks) in a more open and flexible scheme (namely through micro licensing) thus finally opening the market to non-MNO business-players. However, said recent work does not provide any detail or information on how to manage the negotiation of spectrum shares among different entities nor tackle practical problems, e.g., avoiding frequency interference or bandwidth interference with existing technologies, to achieve a complete solution. Instead, said recent work only focuses on radio access aspects, neglecting other networking domains which are important for the establishment of end-to-end services with performance guarantees.

SUMMARY

According to an embodiment, a method is provided for enabling dynamic resource ownership transfer among network slice tenants. The method includes acquiring an initial share of resources, admitting a plurality of tenants to a private blockchain platform, initiating a resource transaction process within a consortium of peer nodes, and validating proposed transactions in a distributed and automatized way. An infrastructure provider (InP) provides a mobile network that is virtually divided into a set of slices, and an intermediate broker (IB) regulates transactions, executed via a blockchain, by which resources are distributed between tenants. A smart contract (SC) running within the blockchain implements resource auditing among tenants and enforces IB-specific policies in managing transfers of the resources between the tenants. A consensus algorithm validates the transactions, and the infrastructure provider (InP) processes validated transactions and enforces transaction directives in the resource allocation process.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
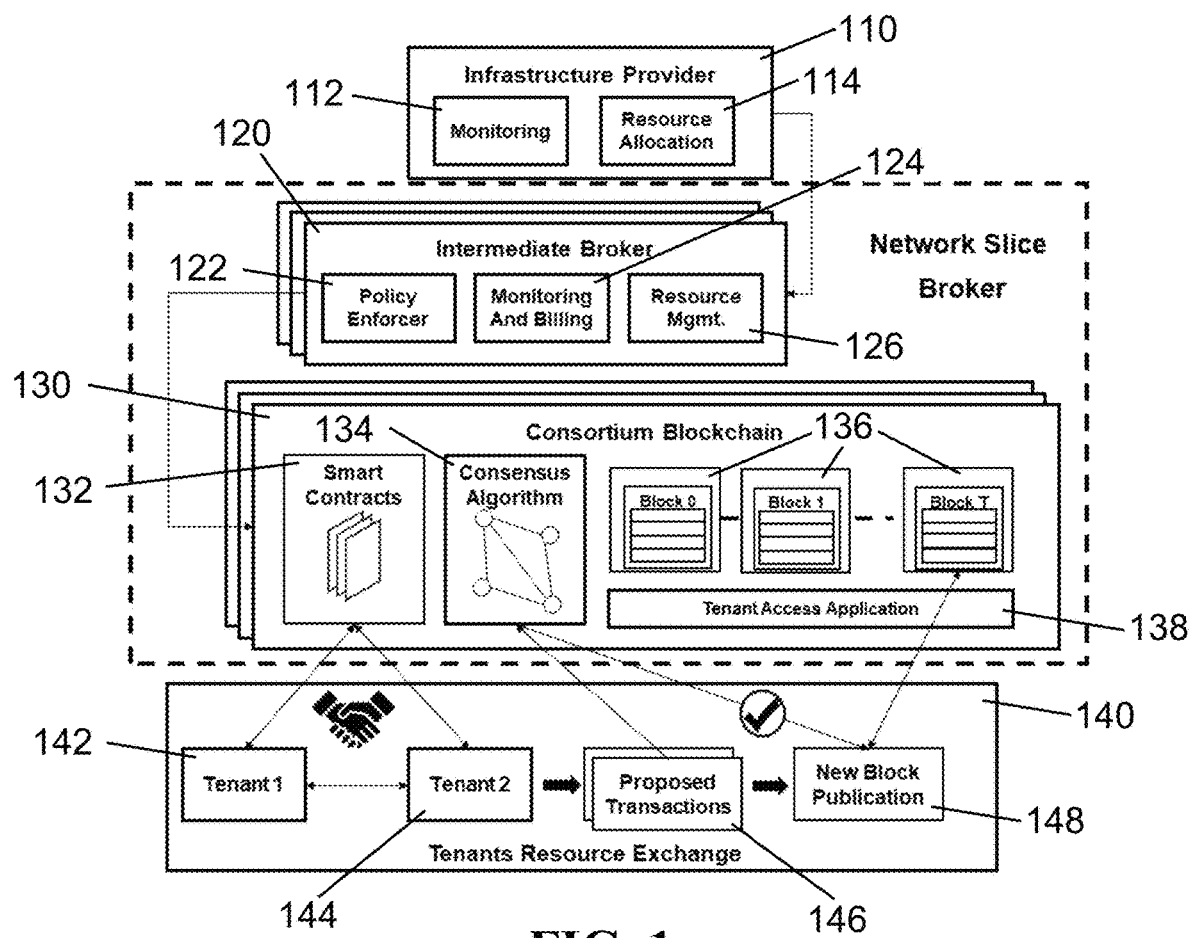
FIG. 1 illustrates an architecture including multiple entities involved in the slice brokerage process according to an embodiment of the invention.

The network slicing paradigm enables InPs to profit from their own infrastructure by offering different dedicated virtualized mobile instances to tenants. In a dynamic network slice ecosystem, dynamic and real-time resource allocation over the mobile network must be supported. In fast-changing scenarios, even tenants' requirements may vary as a result of external causes, e.g., end-users' mobility, thereby potentially leaving tenants with under- and/or over-provisioned network slices and the need to acquire or release resources. The assignment of network resources to tenants in these cases requires that the resource allocation process dynamically adjust to tenants' demand variations—especially for real-time use-cases.

However, in order to avoid conflicts when different tenants share the same mobile infrastructure (i.e. network and computing resources), dispute resolution mechanisms must be in place in order to validate new requests against long-running policies and instructions before such new requests are enforced. In order to identify solutions for mobile infrastructure sharing, current solutions require long negotiation processes—which hardly satisfy the short time-to-market deployment requirements of 5G use cases (i.e. the need of 3rd party industries to deploy services and/or applications at the InP premises and allow end-users to access said services and/or applications with limited delay). In addition, current mobile infrastructure sharing solutions are susceptible to unaddressed security threats. Furthermore, current mobile infrastructure sharing solutions require a one-to-one negotiation that prevents efficient assignment and management of resources (both network resources and computational resources) within a multi-tenant environment.

In particular, prior art mobile network management systems and methods are limited by several technical issues in their ability to provide network slicing configurations that can adapt, in real-time, to variations in network resource demand. First of all, prior art systems and methods rely on a centralized management entity for the negotiation of any reallocation of network resources from one network slice to another, i.e. to reassign network resources from one $3^{rd}$ party service provider to another. The reliance on a centralized management entity results in a greater than necessary amount of network bandwidth being consumed by messages that are transmitted between the centralized management entity, $3^{rd}$ parry service providers who wish to acquire additional resources, and $3^{rd}$ party service providers who wish to release network resources with which they have previously been provided. Furthermore, when a centralized management entity is responsible for reassigning network resources from an initial allocation to an updated allocation that is responsive to current network resource demands, complicated network optimization problems arise that require considerable computational power to solve in a centralized manner. In order to efficiently solve such optimization problems, rigid constraints may be placed on the form of solutions to such problems thereby limiting the flexibility with which network resources can be reassigned. Finally, longer than necessary delays in implementing the reallocation of resources result from exchanging a greater than necessary number of communications in negotiating the reallocation and from solving the complicated network optimization problems. The collective impact of such problems is to limit both the efficacy and expediency with which network resource allocations to multiple network slices can be updated to account for fluctuations in demand.

The present disclosure describes frameworks that allow multiple stakeholders to operate a slice resource brokering system and to assign and validate appropriate resource usage levels in order to meet the time-varying network resource demands of tenants. The frameworks allow a chain of network resource loans to be negotiated in a secure, automated, transparent, and fast way, such that the life cycle of each slice is not affected. In particular, the present disclosure describes frameworks that enable individual network slice tenants (and IBs) to negotiate directly with one another for the reallocation of network resources. By decentralizing the resource reallocation decision making from a centralized entity to the individual network slice tenants and/or IBs, both the network bandwidth and the network computational power required for network resource management operations are reduced. Furthermore, decentralizing the resource reallocation decision making from a centralized entity to the individual network slice tenants and/or IBs additionally increases the flexibility with which network resources can be reallocated (by, e.g., allowing individual network slice tenants to specify an amount of resources to acquire/release). In addition, decentralizing the resource reallocation decision making provides a significant decrease in the time required to execute resource reallocation operations thereby rendering the network more responsive to real-time fluctuations in network resource demand. As a result, the frameworks described by the present disclosure increase the overall network resource utilization rate and thus allow for an increase in the service level provided by a static amount of network resources.

The present disclosure describes the use of blockchain technology for negotiation of mobile infrastructure sharing solutions. Blockchain technology is a candidate that satisfies numerous requirements of 5G use cases. Due to its decentralized nature, the distributed ledger provided by the blockchain enables all members of the system (who can include but may not be limited to the network tenants that subscribe to the services of a particular MNO and/or IB as well as one or more IBs who facilitate the exchange of network resources) to be aware of both current and past network resource availability and to be informed, in real-time, of the dynamic exchange of resources. The blockchain provides such information to system members through a hash-chain of blocks containing the ongoing transactions. This enables all system members to be aware of all information contained in the blockchain.

The present disclosure describes a framework based on a permissioned multi-resource blockchain that allows heterogeneous tenants to autonomously negotiate mobile network resource shares (e.g. network slices) within an intermediate broker (TB) domain—and to do so in a secure, automated, and scalable way. The framework further solves disputes that may arise when multiple parties contend for the same shared resources.

Secure resource exchange can be guaranteed by smart contracts (SCs) and distributed consensus algorithms, allowing the system to evolve autonomously and without the need of centralized authorities or mechanisms to control the transactions via which resources are exchanged between different parties. In the blockchain context, SCs can be used to automatize the exchange of assets in reply to trigger events. A smart contract can be defined as an agent that translates contractual clauses into self-enforcing software thereby minimizing—or eliminating—the need for trusted intermediaries. SCs are stored in the blockchain and provided with a unique address, making them easy to be reached by all peers in the network and allowing them to inherit useful security features like distributed consensus agreements to prevent fraudulent usage.

Slice-brokering can be accomplished by considering all the physical and virtualized networking resources belonging to a particular mobile network operator (MNO) as a single infrastructure domain—even if the slice-brokering is not strictly limited thereto. For example, physical and virtualized networking resources belonging to multiple entities, e.g. multiple MNOs, could be deemed to belong to a single infrastructure domain for the purposes of effecting the slice-brokering. The multi-resource private (permissioned) blockchain infrastructure can deal with the exchange of resources, made pursuant to resource requests and resource advertisements, within already admitted and running slices. A resource request is, e.g., a bid to acquire network resources for a predefined period of time, and a resource advertisement is, e.g., an offer to provide/loan network resources for a predefined period of time. With this approach, the overall ecosystem can realize, from a reduction of the overall system complexity (as compared with state-of-the-art systems that rely on a centralized entity to manage resource exchanges), benefits in the form of, e.g., of faster exchange of network resources as well as from an increase in security (as all business entities are authenticated before admission).

The present disclosure further describes the negotiation of all the technological domains of a mobile network deployment—even with fine granularity—thereby providing a flexible, multi-resource negotiation procedure.

The present invention provides systems and processes that present technical mechanisms that enable new business models in the context of network slicing. More specifically, the systems and processes provided by the present invention achieve technical advantages by enabling a consortium of slice tenants and/or IBs to administrate and manage intra-slice and/or inter-slice resource brokering processes in a dynamic and secure manner without the need of a centralized control authority. In particular, the systems and processes provided by the present invention achieve such technical advantages by utilizing a blockchain-based system that implements a consensus algorithm.

Embodiments of the present invention provide hierarchical systems that implement a multi-resource blockchain architecture and enable dynamic resource exchange (networking and computing resources) among network tenants by exploiting transaction directives. Embodiments of the invention additionally provide systems in which network tenants are able to negotiate mobile network resource shares based on requirements of their own applications in an autonomous fashion through a secure and distributed framework, in order to maximize the cost-efficiency of network resources usage as well as corresponding revenues.

Embodiments of the present invention exploit blockchain technology to transfer ownership of virtualized network resources among a consortium of stakeholders. In this manner, network slice tenants can perform resource brokering directly with one another. Broadly speaking, a blockchain is a distributed data structure that is shared among multiple members of a network. Each block stores information about a set of transactions, e.g. a timestamp, an amount of a good exchanged, partners involved in the transaction, and, most importantly, a reference to the previous block of the chain (usually the hash of its content). The creation of new blocks involves secure cryptographic mechanisms that make the chain unalterable and safe against fraudulent attacks. The content of a blockchain database is broadcast and updated in a decentralized manner. The absence of centralized control provides for an advantage in the form of data transparency.

The use of a private blockchain with permissioned access (as opposed to a public blockchain) is preferable to maintain high security levels in the context of an enterprise facility such as that represented by a mobile network infrastructure. Furthermore, private blockchains with permissioned access do not require energy consuming activities related to block validation processes—which have been identified as one of the main drawbacks of public blockchains. In addition, the use of a private blockchain with permissioned access enables the assumption that peer nodes admitted in the system are trustworthy (i.e. not malicious) and rational (i.e. profit driven).

SCs can be exploited to guarantee reliable auditing and enforce IB-specific policies in the management of requests. For example, one IB may decide to auction a share of resources or simply sell them to the first come tenant. Peer nodes can invoke a SC by sending transactions to its address. For example, in proposing a new transaction in the system, a node can insert the contract address as the recipient address of the transaction. To validate the resource exchange, all the peer entities execute the code using, for example, transaction payloads and a current system state as input arguments of the call. The participation at the consensus protocol assures that the new output ledger comes from valid transactions.

When new transaction proposals flow into the system, they must be validated by peer nodes and written in a new block of the blockchain (so as to be broadcast to the other members of the system). The process of validating transaction proposals by distributed peer nodes is commonly referred to as "consensus," and its implementation is defined in a "consensus protocol"—which involves multiple computational nodes (i.e. the peer nodes) handling an overall message exchange in a distributed way. As the solutions described herein utilize a private blockchain, the required consensus algorithms can be less complex than those utilized in public blockchains. This results, from an IT perspective, in a reduction in a number of peer nodes required to run the system. Nevertheless, such nodes must be present in the blockchain system and, for security purposes, such nodes should belong to different system entities (tenants, IBs, or even third parties). This assures that multiple independent entities evaluate transaction proposals thereby reducing the possibility of fraudulent behaviors.

Being that the output of the negotiation process is immutable due to the distributed validation process, tenants within a blockchain system are directly responsible for the management of their transaction requests (e.g. transaction requests cannot be withdrawn once issued). At the same time, the immutability feature assists in solving disputes related to accounting and/or management of resources. All the details related to a single transaction, including, e.g., the set of allocated resources and the time period, are stored within the blockchain and cannot be contested.

In order to enable dynamic resource exchange among tenants, a dedicated blockchain must be set up for every consortium. In this scenario, the IB will act as a regulator and will be in charge of overseeing the entire network setup and enforce specific policies by means of SCs, e.g. those related to negotiation and transaction processes. See, e.g., W. Li, A. Sforzin, S. Fedorov, G. O. Karame, "Towards Scalable and Private Industrial Blockchains", Proceedings of the ACM Workshop on Blockchain, Cryptocurrencies and Contracts (BCC), pp. 9-14, April 2017

Each IB $b_n$ deploys the first block of the respective blockchain and stores a registry of resources on it. The first block contains information related to available network resources and is used as a foundation for further resource exchange among tenants. Specifically, the registry of resources reflects an amount of resources allocated by the InP to the IB $b_n$. Establishing the exact resources allocated by the InP to the IB $b_n$ is necessary to avoid over-selling of resources. Each IB $b_n$ can define its leasing policies and code them in a set of SCs that are then available to peer nodes (i.e. the permissioned network slice tenants) on the blockchain. Finally, the IB $b_n$ oversees an initial assignment of the allocated resources to incoming tenants.

Upon creation of a private exchange domain (i.e. a software platform that allows tenants participating in the blockchain to exchange transaction requests), network slice requests can be dispatched among the network of peers. According to their real-time requirements, a tenant may decide to publish a resource advertisement or a resource request message. In the case of the former (a resource advertisement), the current owner of a resource or set of resources decides to offer the resource or set of resources, or a share thereof, to the other tenants participating in the market. In the case of the latter (a resource request message), a tenant broadcasts its need for additional resources to other tenants that may be interested in leasing a portion of their quota of resources, i.e. the resources allocated by the IB. To guarantee authentication, each message (i.e. resource advertisement or resource request message) is signed with a private key of the sender (i.e. advertising or requesting tenant) and uniquely identified by an ID number.

The network slicing brokerage system described herein must deal with multi-domain resource allocation problems. A resource request from tenant t can be defined as a tuple $\theta_t = \{\rho, \tau, \gamma\}$, where $\rho,\tau,\gamma$ represent a percentage of initially assigned radio access, transport, and core cloud resources, respectively. As the initial assignment of radio access, transport, and core cloud resources to all tenants are known to all other tenants from information provided in the first block, mapping the percentage of initially assigned resources to absolute amounts of resources (e.g. in the form of physical resource blocks, transport bandwidth, CPU power and RAM) can be easily derived. The SCs by which transactions for the exchange of resources are executed verify the availability of resources of the tenants involved in each transaction. Transactions do not go through if the party offering to provide network resources does not actually possess the resources required to satisfy the resource request across every dimension—e.g. radio access, transport, and core cloud resources. In other words, if the party offering to provide network resources possesses sufficient radio access resources to satisfy a resource request but does not possess sufficient cloud resources to satisfy the request, the transaction is dropped. However, the decisions tenants to request more resources or offer its own resources are individual.

The network slicing brokerage system described herein does not impose any limitation over the nature of the resources that are exchanged, and that the proposed resource request messages can be extended to include additional intra-domain resource specifications. For example, a resource request message could be extended to indicate a tenant's desire to acquire or lease only RAN resources at the edge of a network, e.g., for delay sensitive applications, or alternatively, a tenant's desire to acquire or lease cloud resources, e.g., storage and processing power for data analytic applications—possibly in the context of the internet of things (IoT) applications.

The network slicing brokerage system described herein provides for a resource set to be transferred from one tenant to another by invoking a transaction on the blockchain. The transaction is validated only if all the relevant parties agree. Specifically, validation requires establishing a consensus among peer nodes. When dealing with consensus algorithms, a trade-off between transaction throughput and latency must be considered. For this reason, the network slicing brokerage system described herein enables each IB $b_n$ to choose a preferred method for establishing consensus (i.e. a preferred consensus algorithm) according to service latency and security requirements. In the context of a permissioned framework for a mobile network infrastructure, the use of relatively light consensus mechanisms (e.g. the practical Byzantine fault tolerance (PBFT) or Kafka consensus protocols) provide adequate security while providing fast convergence to a common agreement thereby enabling rapid exchange of resources.

A blockchain can be seen as a transaction-based state machine, where its state is updated every time consensus is reached on a set of transactions. To this aim, orderer nodes can be introduced and exploited to collect and order, by time, the proposed transactions. These nodes are usually not involved in the validation steps, but they allow decoupling and parallel processing of ordering and validation functionalities thereby improving the overall system efficiency.

In addition to enabling a more dynamic market for trading network infrastructure resources, blockchain technology also facilitates the accounting of different resources exchanged over time. From the InP perspective, this simplifies the billing management process as each block of transactions stored in the chain includes precise indications of the type of resources exchanged and the corresponding time window utilization.

According to embodiments of the invention, systems and processes are provided whereby tenants of a network slice can execute intra-slice resource transfer transactions via a permissioned blockchain. Specifically, tenants can publish, according to their real-time requirements, a resource advertisement or a resource request message. In case of the former (i.e. a resource advertisement), a current owner of resources (resource owner tenant) decides to release some share of said resources thereby making that share of resources available on the market. In case of the latter (i.e. a resource request message), a tenant broadcasts a need for additional resources to other tenants who may be interested in providing some share of an assigned quota of resources. To guarantee authentication, each message (i.e. resource advertisement or resource request message) is signed with a private key of the sender and uniquely identified by an ID number. In such embodiments, SCs are utilized to guarantee reliable auditing and enforcement of IB-specific policies in the management of requests. Furthermore, the IBs are not required to establish any specific manner of transferring slice resources, e.g. auction, first-come-first-serve, etc. In the systems and processes provided according to such embodiments, the IB reads a chain of slice transactions and changes the scheduling policy according to the new network resource allocation after a transfer phase is completed.

According to further embodiments of the invention, systems and processes are provided in which that IBs and an InP are permissioned users of a private blockchain via which inter-slice resource transfer transactions can be executed. In such embodiments, IBs can issue resource advertisements or resource request messages whereby they offer available resources or acquire additional resources according to their real-time needs. To guarantee authentication, each message (i.e. resource advertisement or resource request) is signed with a private key of the sender IB and uniquely identified by an ID number. In such systems and processes, the InP only needs to deal with a limited number of parties (specifically, the permissioned IBs). Furthermore, such systems and processes for inter-slice resource transfer need not place any limitations on the type of transactions via which resources are transferred. After a resource transfer or auction phase, the InP can read the chain of transactions and enforce a new scheduling policy according to the resulting network resource distribution.

According to additional embodiments of the invention, systems and processes are provided in which both tenants and IBs are permissioned users of a private blockchain via which both intra-slice and inter-slice resource transfer transactions can be executed. In such systems and processes, both IBs and respective tenants are permissioned users of the same blockchain and can issue resource advertisements or resource request messages at the same time. The request or release of resources by a respective IB is automatically managed by SCs running in the blockchain that are aware of and take into account the total resources allocated to tenants of that respective IB. Moreover, such resources can be obtained by an exchange with other IBs or from the InP. In such systems and processes, the InP only needs to deal with a limited number of parties (specifically, the permissioned IBs), while allowing for the maximum efficiency in terms of tenants' real-time requirement satisfaction and network resource utilization.

According to an embodiment, a method for enabling dynamic resource ownership transfer among network slice tenants is provided. The method includes acquiring an initial share of resources, admitting a plurality of tenants to a private blockchain platform, initiating a resource transaction process within a consortium of peer nodes, and validating proposed transactions in a distributed and automatized way. An infrastructure provider (InP) provides a mobile network that is virtually divided into a set of slices, and an intermediate broker (IB) regulates transactions, executed via a blockchain, by which resources are distributed between tenants. A smart contract (SC) running within the blockchain implements resource auditing among tenants and enforces IB-specific policies in managing transfers of the resources between the tenants. A consensus algorithm validates the transactions, and the infrastructure provider (InP) processes validated transactions and enforces transaction directives in the resource allocation process.

According to an implementation of the method, acquiring an initial share of resources from the InP includes receiving a resource registry from the InP.

According to an implementation of the method, admitting the plurality of tenants to the private blockchain platform includes creating a first block of a private blockchain of the private blockchain platform. The resource registry reflects the initial share of resources received from the InP.

According to an implementation of the method, the private blockchain platform includes smart contracts, a consensus algorithm, and a tenant access application.

According to an implementation of the method, the smart contracts facilitate the resource transaction process in a manner that ensures that no resource allocation policies are violated.

According to an implementation of the method, the resource transaction process is initiated by receiving, via the tenant access application, a plurality of resource advertisement and/or resource request messages.

According to an implementation of the method, each of the resource advertisement and/or resource request messages includes a public key of a tenant who issued the message.

According to an implementation of the method, tenants indicate, via the tenant access application, consent to acquire advertised resources and/or to provide requested resources in response to the resource advertisement and/or resource request messages thereby initiating smart contracts.

According to an implementation of the method, the initiated smart contracts generate transaction response messages.

According to an implementation of the method, the transaction response messages include a message ID that identifies a resource advertisement or resource request message and a public key of a tenant that indicated consent to acquire the advertised resources or provide requested resources in response to the resource advertisement or resource request message.

According to an implementation of the method, the transaction response message further includes a response ID and a timestamp.

According to an implementation of the method, the consensus algorithm is specified in the private blockchain platform.

According to an implementation of the method, the consensus algorithm is partial Byzantine Fault Tolerance (pBFT) or Kafka.

According to an embodiment, a non-transitory computer readable medium having stored thereon computer executable instructions for performing a method for enabling dynamic resource ownership transfer among network slice tenants is provided. The method includes acquiring an initial share of resources, admitting a plurality of tenants to a private blockchain platform, initiating a resource transaction process within a consortium of peer nodes, and validating proposed transactions in a distributed and automatized way. An infrastructure provider (InP) provides a mobile network that is virtually divided into a set of slices, and an intermediate broker (IB) regulates transactions, executed via a blockchain, by which resources are distributed between tenants. A smart contract (SC) running within the blockchain implements resource auditing among tenants and enforces IB-specific policies in managing transfers of the resources between the tenants. A consensus algorithm validates the transactions, and the infrastructure provider (InP) processes validated transactions and enforces transaction directives in the resource allocation process.

According to an embodiment, a resource allocation server is provided that includes a non-transitory computer readable medium having stored thereon computer executable instructions for performing a method for enabling dynamic resource ownership transfer among network slice tenants. The method includes acquiring an initial share of resources, admitting a plurality of tenants to a private blockchain platform, initiating a resource transaction process within a consortium of peer nodes, and validating proposed transactions in a distributed and automatized way. An infrastructure provider (InP) provides a mobile network that is virtually divided into a set of slices, and an intermediate broker (IB) regulates transactions, executed via a blockchain, by which resources are distributed between tenants. A smart contract (SC) running within the blockchain implements resource auditing among tenants and enforces IB-specific policies in managing transfers of the resources between the tenants. A consensus algorithm validates the transactions, and the infrastructure provider (InP) processes validated transactions and enforces transaction directives in the resource allocation process.

FIG. 1 illustrates an architecture including multiple entities involved in the slice brokerage process according to an embodiment of the invention. The architecture illustrated in FIG. 1 includes an infrastructure provider (InP) 110, an intermediate broker (IB) 120, a consortium blockchain 130, and a tenants' resource exchange 140. The InP 110 includes a monitoring processing system 112 and a resource allocation processing system 114. The monitoring processing system 112 and the resource allocation processing system 114 can, according to different variations, be the same processing system, be processing systems that share various components, or be mutually exclusive processing systems. The IB 120 includes a policy enforcer processing system 122, a monitoring and billing processing system 124, and a resource management processing system 126. The policy enforcer processing system 122, the monitoring and billing processing system 124, and the resource management processing system 126 can, according to different variations, be the same processing system, be processing systems that share various components, or be mutually exclusive processing systems.

The architecture illustrated in FIG. 1 additionally includes the consortium blockchain 130, an instance of which is maintained by each of a plurality of permissioned tenants and by the IB 120. The consortium blockchain 130 includes smart contracts (SCs) 132, a consensus algorithm 134 (e.g. pBFT or Kafka consensus protocols), and blocks 136. In addition, the consortium blockchain 130 includes tenant access application 138. Furthermore, the architecture illustrated in FIG. 1 includes tenants' resource exchange 140. In the tenants' resource exchange, different tenants (e.g. Tenant 1 142 and Tenant 2 144) can exchange ownership/control of resources via proposed transactions 146 that are verified via the consortium blockchain 130 and then added to the consortium blockchain 130 via publication of a new block (represented as element 148).

Figure 2:
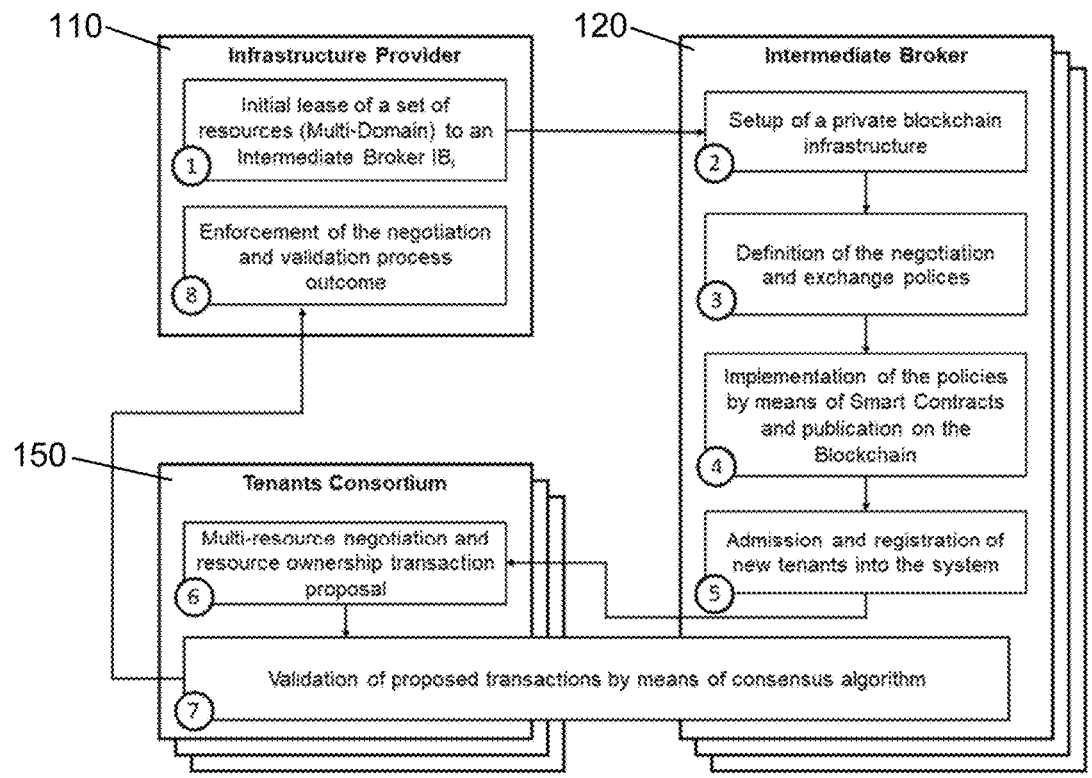
FIG. 2 illustrates an overall workflow for a decentralized network resource brokering process according to an embodiment of the invention.

FIG. 2 illustrates an overall workflow for a decentralized network resource brokering process according to an embodiment of the invention. The workflow illustrated in FIG. 2 involves the InP 110, the IB 120, and a tenants consortium 150—which includes Tenant 1 142 and Tenant 2 144. At step 1 of the workflow illustrated in FIG. 2, the InP 110 provides an initial lease of a set of resources to the IB 120. At step 2 of the workflow, the IB 120 sets up a private blockchain infrastructure. At step 3 of the workflow, the IB 120 defines negotiation and exchange policies that govern the exchange of resources via transactions to be executed via the private blockchain infrastructure. At step 4 of the workflow, the IB 120 implements the policies defined in step 3 via smart contracts (e.g. SCs 132) and publication of transactions on the blockchain (e.g. the consortium blockchain 130). At step 5 of the workflow, the IB 120 admits new tenants to the consortium and executes registration procedures for the new tenants. At step 6 of the workflow, the tenants consortium 150 engages in multi-resource negotiation procedures and propose resource ownership transactions, and at step 7 the tenants consortium 150 and the IB 120 collectively perform validation of proposed transactions by way of a consensus algorithm (e.g. the consensus algorithm 134). Finally, at step 8 of the workflow, the InP 110 enforces the outcome of the negotiation and validation process carried out at steps 6 and 7.

Figure 3A:
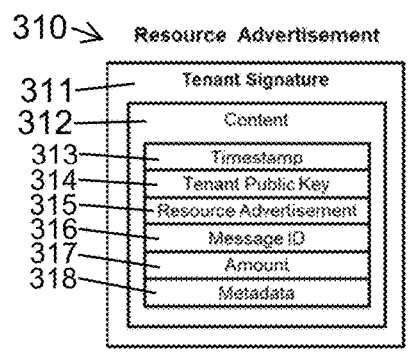
FIG. 3a illustrates a simplified structure of a resource advertisement message according to an embodiment of the invention.

FIG. 3a illustrates a simplified structure of a resource advertisement message 310 according to an embodiment of the invention. The resource request or resource advertisement message 310 illustrated in FIG. 3a includes a signature 311 of a tenant that sends the message and message content 312. The message content 312 includes a timestamp 313, a public key 314 of the tenant sending the message, a resource advertisement 315 (e.g. an identifier of the specific resources being advertised), a message ID 316, an amount of resources advertised 317 (e.g. a number and/or period of time for which the advertised resources can be acquired), and metadata 318.

Figure 3B:
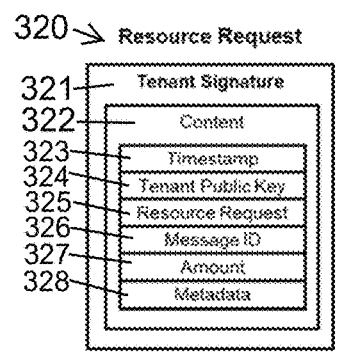
FIG. 3b illustrates a simplified structure of a resource request message according to an embodiment of the invention.

FIG. 3b illustrates a simplified structure of a resource request message according to an embodiment of the invention. The resource request message 320 illustrated in FIG. 3b includes a signature 321 of a tenant that sends the message and message content 322. The message content 322 includes a timestamp 323, a public key 324 of the tenant sending the message, a resource request 325 (e.g. an identification of characteristics of desired resources), a message ID 326, an amount of resources requested 327 (e.g. a number and/or period of time for which the desired resources are desired to be acquired for), and metadata 328.

Figure 3C:
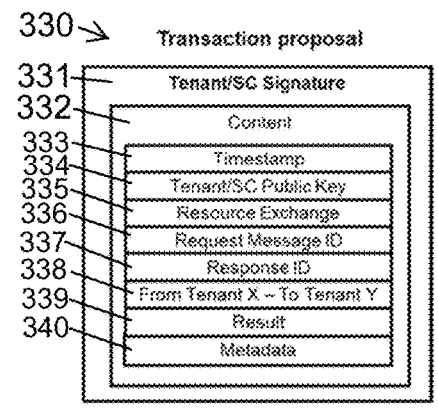
FIG. 3c illustrates a simplified structure of a transaction proposal message according to an embodiment of the invention.

FIG. 3c illustrates a simplified structure of a transaction proposal message according to an embodiment of the invention. The transaction proposal message 330 illustrated in FIG. 3c includes a signature 331 of a tenant or a smart contract (SC) that sends the transaction proposal and transaction proposal content 332. The transaction proposal content 332 includes a timestamp 333, a public key 334 of the tenant or SC that sends the transaction proposal, a resource exchange 335 (e.g. an identification of the resources being exchanged, possibly including additional transaction details), a request message ID 336 of the request message and a response ID 337 of a message responding to the resource request, an identification of the tenant from which resources are being provided and the tenant from which resources are being received 338, a result 339, and metadata 340.

Figure 4:
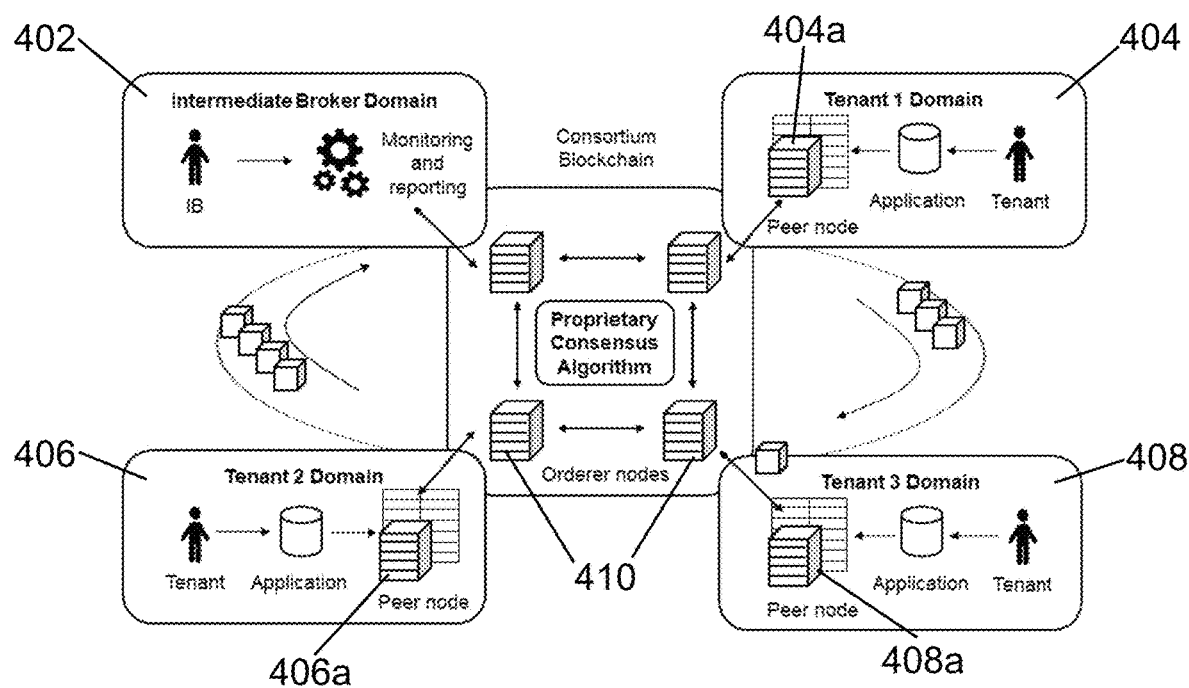
FIG. 4 illustrates the transfer of ownership of a resource set from one tenant to another according to an embodiment of the invention by invoking a transaction on a blockchain.

FIG. 4 illustrates a consortium blockchain according to an embodiment of the invention via which transfer of ownership of a resource set from one tenant to another can be executed. The consortium blockchain (e.g. the consortium blockchain 130) includes an instance located at an intermediate broker domain 402, an instance located at a Tenant 1 domain 404 (which includes peer node 404a), an instance located at a Tenant 2 domain 406 (which includes peer node 406a), and an instance located at a Tenant 3 domain 408 (which includes peer node 408a). The consortium blockchain further includes a plurality of orderer nodes 410. Collectively, the orderer nodes 410 collect and order, by time, the transactions proposed by the peer nodes 404a, 406a, 408a. The peer nodes 404a, 406a, 408a also collectively execute a consensus algorithm via which resource exchange transactions proposed and accepted by pairs of the individual peer nodes 404a, 406a, 408a can be validated. Each of the peer nodes 404a, 406a, 408a and the orderer nodes 410 can be, e.g., a computing system.

Figure 5:
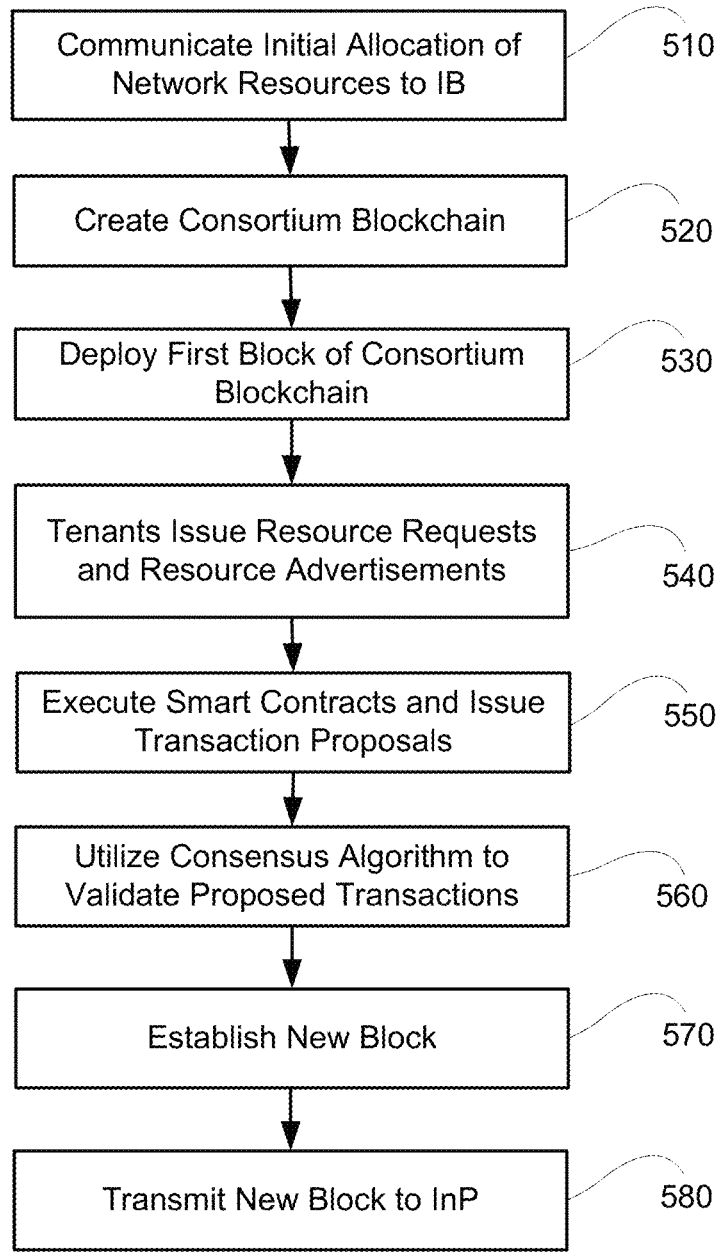
FIG. 5 illustrates a process for performing dynamic resource ownership transfer among network slice tenants.

FIG. 5 illustrates a process for performing dynamic resource ownership transfer among network slice tenants. The process illustrated in FIG. 5 can be executed, e.g., by an IB that is located, e.g., at a network resource management server of an InP. At 510, an initial allocation of network resources is communicated to the IB. For example, a resource registry identifying available network resources and a tenant to which each of the available resources is received by the IB. Tenants to which each of the available resources are assigned can be indicated, e.g., by an identification number or some other identifier. The identification number or identifier can either be or be associated with a tenant public key. The resource registry can further indicate, for each tenant, an initially assigned amount of radio access, transport, and core cloud resources, e.g. in the form of physical resource blocks, transport bandwidth, CPU power and RAM, respectively.

At 520, the IB creates a consortium blockchain. The consortium blockchain includes a tenant access application that provides access to the blockchain to a plurality of tenants. The consortium blockchain additionally includes a plurality of smart contracts, i.e. software implementations of IB transaction policies. The smart contracts can be used to guarantee that proposed transactions do not violate any established resource allocation policies. In addition, the smart contracts can be used to define specific transaction schemes, e.g. auction-based, for managing multiple resource advertisements and resource requests. Finally, the consortium blockchain includes a consensus algorithm that is utilized to validate proposed transactions and achieve consensus across all nodes on the order and identity of completed transactions. Specifically, once a transaction proposal is issued, e.g. by a smart contract, it is up to the overall tenant consortium to validate it, i.e., guarantee that transacting parties actually own the resources they are exchanging. This can be done looking at the information included in the blockchain, i.e. the history of all the transactions that have occurred from the moment the first block was deployed up through the present.

At 530, the IB deploys the first block of the consortium blockchain. The first block of the consortium blockchain includes the resource registry—or a portion thereof—received by the IB at 510. At 540, tenants issue resource requests and resource advertisements, e.g. to the tenant access application. At 550, the tenant access application executes one or more smart contracts that receive the resource requests and resource advertisements as inputs, verify that transactions based on the resource requests and the resource advertisements will not violate any established resource allocation policies, and issue transaction proposals that correspond to, e.g., a single resource advertisement and a single resource request. The transaction proposals are broadcast to the consortium blockchain.

At 560, the consortium, i.e. the tenants and any other participating nodes, e.g. the IB itself, utilizes the consensus algorithm to validate the proposed transactions. At 570, a new block is established that includes the validated transactions. At 580, the IB transmits the new block to the InP thereby providing a set of network resource reassignments to be implemented.

Figure 6A:
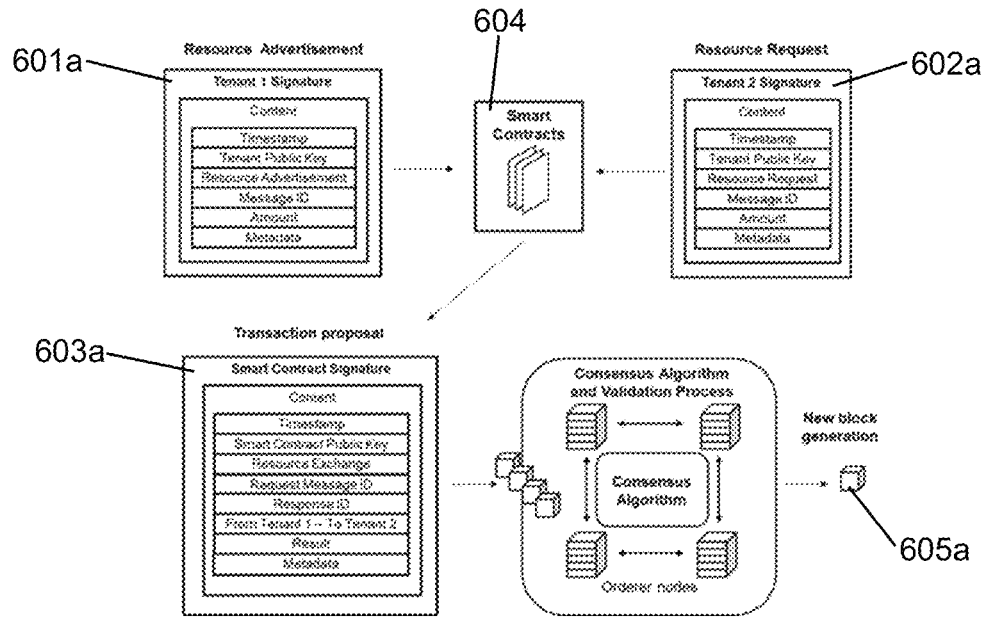
FIGS. 6a and 6b illustrates the exchange of resource advertisement, resource request, and transaction proposal messages according to embodiments.
Figure 6B:
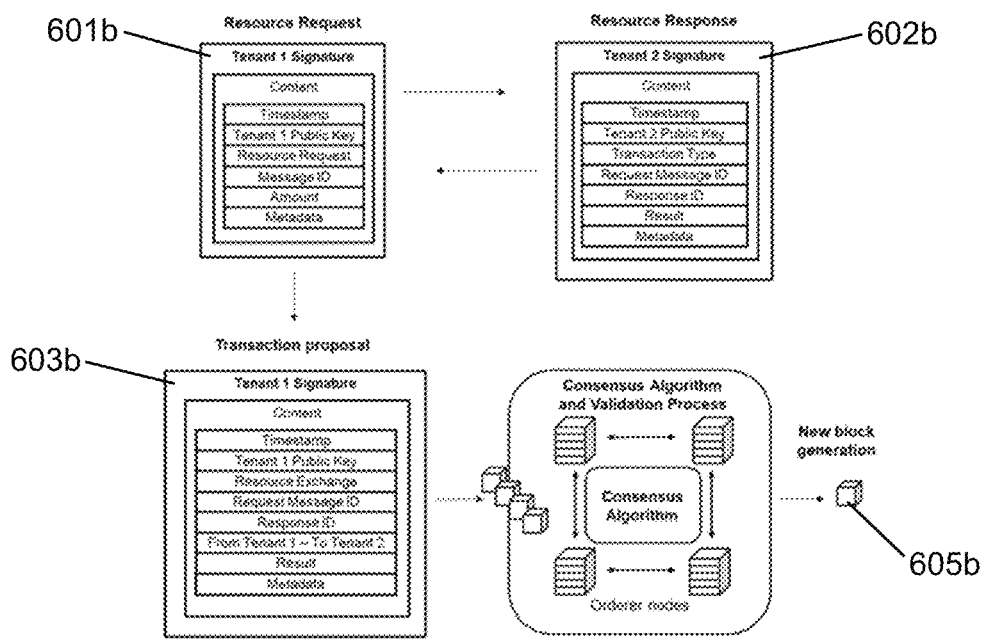

FIGS. 6a and 6b illustrates the exchange of resource advertisement (601a, 601b), resource request (602a, 602b), and transaction proposal messages (603a, 603b) according to embodiments. In FIG. 6a, a smart contract 604 is employed to manage multiple resource advertisement and request messages. In FIG. 6a, the smart contract issues transaction proposals for validation by the consortium. In FIG. 6b, tenants directly exchange resource request and resource advertisement messages and issue transaction proposals for validation by the consortium blockchain. In both FIG. 6a and FIG. 6b, the process ends with a transaction proposal message that identifies a current owner (or owners) of resources to be exchanged in a transaction and the beneficiary of the transaction. Should the transaction proposal be validated by the consortium of tenants, the proposed transaction will be inserted in the next block (605a, 605b) of the blockchain and made available to all the private network thus empowering the final resource ownership exchange. In this regard, tenants will be indirectly notified of a successful outcome of their transaction proposal by monitoring the content of the new block of the blockchain, which will contain (or not contain) a reference to their proposed transaction.

Figure 7:
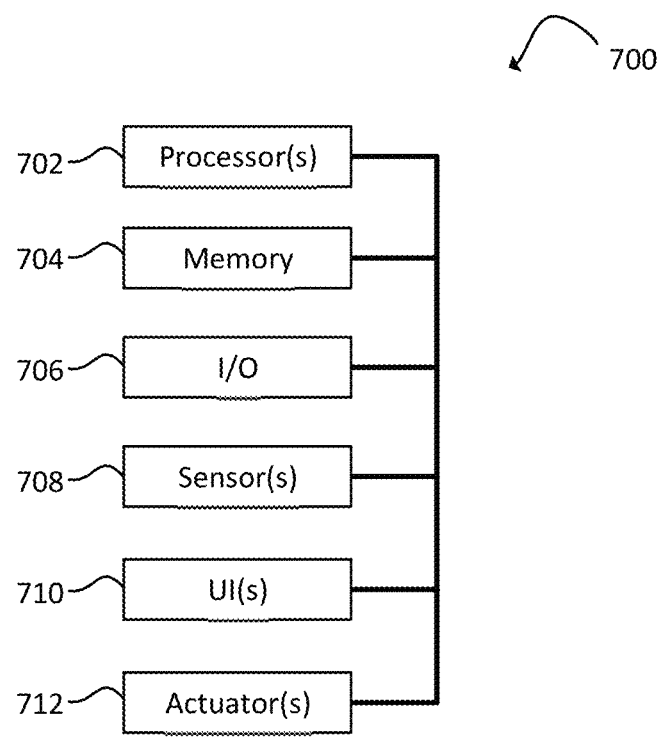
FIG. 7 is a block diagram of an exemplary processing system, which can be configured to perform any and all operations disclosed herein.

Referring to FIG. 7, a processing system 700 can include one or more processors 702, memory 704, one or more input/output devices 706, one or more sensors 708, one or more user interfaces 710, and one or more actuators 712. Processing system 700 can be representative of each computing system disclosed herein.

Processors 702 can include one or more distinct processors, each having one or more cores. Each of the distinct processors can have the same or different structure. Processors 702 can include one or more central processing units (CPUs), one or more graphics processing units (GPUs), circuitry (e.g., application specific integrated circuits (ASICs)), digital signal processors (DSPs), and the like. Processors 702 can be mounted to a common substrate or to multiple different substrates.

Processors 702 are configured to perform a certain function, method, or operation (e.g., are configured to provide for performance of a function, method, or operation) at least when one of the one or more of the distinct processors is capable of performing operations embodying the function, method, or operation. Processors 702 can perform operations embodying the function, method, or operation by, for example, executing code (e.g., interpreting scripts) stored on memory 704 and/or trafficking data through one or more ASICs. Processors 702, and thus processing system 700, can be configured to perform, automatically, any and all functions, methods, and operations disclosed herein. Therefore, processing system 700 can be configured to implement any of (e.g., all of) the protocols, devices, mechanisms, systems, and methods described herein.

For example, when the present disclosure states that a method or device performs task "X" (or that task "X" is performed), such a statement should be understood to disclose that processing system 700 can be configured to perform task "X". Processing system 700 is configured to perform a function, method, or operation at least when processors 702 are configured to do the same.

Memory 704 can include volatile memory, non-volatile memory, and any other medium capable of storing data. Each of the volatile memory, non-volatile memory, and any other type of memory can include multiple different memory devices, located at multiple distinct locations and each having a different structure. Memory 704 can include remotely hosted (e.g., cloud) storage.

Examples of memory 704 include a non-transitory computer-readable media such as RAM, ROM, flash memory, EEPROM, any kind of optical storage disk such as a DVD, a Blu-Ray® disc, magnetic storage, holographic storage, a HDD, a SSD, any medium that can be used to store program code in the form of instructions or data structures, and the like. Any and all of the methods, functions, and operations described herein can be fully embodied in the form of tangible and/or non-transitory machine-readable code (e.g., interpretable scripts) saved in memory 704.

Input-output devices 706 can include any component for trafficking data such as ports, antennas (i.e., transceivers), printed conductive paths, and the like. Input-output devices 706 can enable wired communication via USB®, DisplayPort®, HDMI®, Ethernet, and the like. Input-output devices 706 can enable electronic, optical, magnetic, and holographic, communication with suitable memory 706. Input-output devices 706 can enable wireless communication via WiFi®, Bluetooth®, cellular (e.g., LTE®, CDMA®, GSM®, WiMax®, NFC®), GPS, and the like. Input-output devices 706 can include wired and/or wireless communication pathways.

Sensors 708 can capture physical measurements of environment and report the same to processors 702. User interface 710 can include displays, physical buttons, speakers, microphones, keyboards, and the like. Actuators 712 can enable processors 702 to control mechanical forces.

Processing system 700 can be distributed. For example, some components of processing system 700 can reside in a remote hosted network service (e.g., a cloud computing environment) while other components of processing system 700 can reside in a local computing system. Processing system 700 can have a modular design where certain modules include a plurality of the features/functions shown in FIG. 7. For example, I/O modules can include volatile memory and one or more processors. As another example, individual processor modules can include read-only-memory and/or local caches.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for enabling dynamic resource ownership transfer among network slice tenants, the method comprising:
   acquiring an initial share of resources;
   admitting a plurality of tenants to a private blockchain platform;

initiating a resource transaction process within a consortium of peer nodes; and validating proposed transactions in a distributed and automatized way, wherein an infrastructure provider (InP) provides a mobile network that is virtually divided into a set of slices, wherein an intermediate broker (IB) regulates transactions, executed via a blockchain, by which resources are distributed between tenants, wherein a smart contract (SC) running within the blockchain implements resource auditing among tenants and enforces IB-specific policies in managing transfers of the resources between the tenants, wherein a consensus algorithm validates the transactions, and wherein the infrastructure provider (InP) processes validated transactions and enforces transaction directives in the resource allocation process.

2. The method of claim 1, wherein acquiring an initial share of resources from the InP includes receiving a resource registry from the InP.

3. The method of claim 2, wherein admitting the plurality of tenants to the private blockchain platform includes creating a first block of a private blockchain of the private blockchain platform, wherein the resource registry reflects the initial share of resources received from the InP.

4. The method of claim 1, wherein the private blockchain platform includes smart contracts, a consensus algorithm, and a tenant access application.

5. The method of claim 4, wherein the smart contracts facilitate the resource transaction process in a manner that ensures that no resource allocation policies are violated.

6. The method of claim 4, wherein the resource transaction process is initiated by receiving, via the tenant access application, at least one of: a plurality of resource advertisement and resource request messages.

7. The method of claim 6, wherein tenants indicate, via the tenant access application, at least one of consent: to acquire advertised resources and to provide requested resources, in response to the at least one resource advertisement or resource request messages, thereby initiating smart contracts.

8. The method of claim 7, wherein the initiated smart contracts generate transaction response messages.

9. The method of claim 8, wherein the transaction response messages include a message ID that identifies a resource advertisement or resource request message and a public key of a tenant that indicated consent to acquire the advertised resources or provide requested resources in response to the resource advertisement or resource request message.

10. The method of claim 9, wherein the transaction response message further includes a response ID and a timestamp.

11. The method of claim 10, wherein the consensus algorithm is specified in the private blockchain platform.

12. The method of claim 11, wherein the consensus algorithm is partial Byzantine Fault Tolerance (pBFT) or Kafka.

13. The method of claim 1, wherein the resources comprise radio access resources and cloud computing resources.

14. The method of claim 13, wherein at least one of the transactions executed via the blockchain causes at least two of the tenants to exchange radio access resources.

15. The method of claim 14, wherein the at least two tenants exchange the radio access resources based on the at least one transaction after the blockchain has validated the transaction by establishing a new block that includes the validated transaction.

16. A method for enabling dynamic resource ownership transfer among network slice tenants, the method comprising:

acquiring an initial share of resources;

admitting a plurality of tenants to a private blockchain platform;

initiating a resource transaction process within a consortium of peer nodes; and validating proposed transactions in a distributed and automatized way, wherein an infrastructure provider (InP) provides a mobile network that is virtually divided into a set of slices, wherein an intermediate broker (IB) regulates transactions, executed via a blockchain, by which resources are distributed between tenants, wherein a smart contract (SC) running within the blockchain implements resource auditing among tenants and enforces IB-specific policies in managing transfers of the resources between the tenants, wherein a consensus algorithm validates the transactions, wherein the infrastructure provider (InP) processes validated transactions and enforces transaction directives in the resource allocation process, wherein the private blockchain platform includes smart contracts, a consensus algorithm, and a tenant access application, wherein the resource transaction process is initiated by receiving, via the tenant access application, at least one of: a plurality of resource advertisement and resource request messages, and wherein, the at least one resource advertisement or resource request messages, includes a public key of a tenant who issued the message.

17. A non-transitory computer readable medium having stored thereon computer executable instructions for performing a method for enabling dynamic resource ownership transfer among network slice tenants, the method comprising:

acquiring an initial share of resources;

admitting a plurality of tenants to a private blockchain platform;

initiating a resource transaction process within a consortium of peer nodes; and validating proposed transactions in a distributed and automatized way, wherein an infrastructure provider (InP) provides a mobile network that is virtually divided into a set of slices, wherein an intermediate broker (IB) regulates transactions, executed via a blockchain, by which resources are distributed between tenants, wherein a smart contract (SC) running within the blockchain implements resource auditing among tenants and enforces IB-specific policies in managing transfers of the resources between the tenants, wherein a consensus algorithm validates the transactions, and wherein the infrastructure provider (InP) processes validated transactions and enforces transaction directives in the resource allocation process.

18. A resource allocation server configured to perform the method of claim 1.

19. A resource allocation server configured to perform the method of claim 16.

\* \* \* \* \*